US012596959B2

(12) United States Patent
Dethise et al.

(10) Patent No.: US 12,596,959 B2
(45) Date of Patent: Apr. 7, 2026

(54) METHOD FOR COLLABORATIVE MACHINE LEARNING

(71) Applicant: Nokia Solutions and Networks Oy, Espoo (FI)

(72) Inventors: Alice Dethise, Stuttgart (DE); Ruichuan Chen, Stuttgart (DE); Istemi Ekin Akkus, Stuttgart (DE); Paarijaat Aditya, Stuttgart (DE); Antti Herman Koskela, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 96 days.

(21) Appl. No.: 18/593,496

(22) Filed: Mar. 1, 2024

(65) Prior Publication Data

US 2024/0303548 A1 Sep. 12, 2024

(30) Foreign Application Priority Data

Mar. 10, 2023 (FI) ..................................... 20235286

(51) Int. Cl.
*G06N 20/00* (2019.01)
*G06F 21/60* (2013.01)

(52) U.S. Cl.
CPC ........... *G06N 20/00* (2019.01); *G06F 21/602* (2013.01)

(58) Field of Classification Search
CPC .... G06N 20/00; G06F 21/602; G06F 21/6245
See application file for complete search history.

(56) References Cited

U.S. PATENT DOCUMENTS

| | | | | |
|---|---|---|---|---|
| 11,526,745 B2* | 12/2022 | Sheller | .................. | G06N 3/063 |
| 11,748,661 B2* | 9/2023 | Jing | ........................ | H04L 9/008 |
| | | | | 706/12 |
| 2017/0372226 A1* | 12/2017 | Costa | ..................... | G06N 20/00 |
| 2020/0082270 A1 | 3/2020 | Gu et al. | | |
| 2020/0250321 A1* | 8/2020 | Wu | ........................ | G06N 20/00 |

(Continued)

FOREIGN PATENT DOCUMENTS

EP         4083868  A1     11/2022

OTHER PUBLICATIONS

Tramer et al., "Stealing Machine Learning Models via Prediction APIs", Proceedings of the 25th USENIX Security Symposium, Aug. 10-12, 2016, pp. 601-618.

(Continued)

*Primary Examiner* — Michael Won
(74) *Attorney, Agent, or Firm* — DITTHAVONG, STEINER, & MLOTKOWSKI

(57) ABSTRACT

A system comprising: at least one training unit for one or more data owners collaborating to the system for storing private data and at least one encrypted model, said training unit being implemented as a trusted execution environment; at least one aggregator unit for each model owner collaborating to the system for storing and executing code of a training algorithm, said aggregator unit being implemented as a trusted execution environment; at least one administration unit for controlling communication and synchronization between the at least one training unit and the at least one aggregator unit, said administration unit being implemented as a trusted execution environment; wherein the communication between the at least one training unit and the at least one aggregator unit is encrypted.

15 Claims, 3 Drawing Sheets

(56) References Cited

U.S. PATENT DOCUMENTS

| | | | |
|---|---|---|---|
| 2020/0327250 A1 | 10/2020 | Wang et al. | |
| 2021/0073677 A1 | 3/2021 | Peterson et al. | |
| 2021/0150037 A1* | 5/2021 | Radhakrishnan | G06N 20/00 |
| 2021/0158216 A1 | 5/2021 | Du et al. | |
| 2021/0374605 A1 | 12/2021 | Qian et al. | |
| 2021/0383280 A1 | 12/2021 | Shaloudegi | |
| 2022/0108226 A1 | 4/2022 | Yu et al. | |
| 2022/0261697 A1* | 8/2022 | Chopra | H04L 9/008 |
| 2022/0294606 A1 | 9/2022 | Norrman et al. | |
| 2022/0374762 A1 | 11/2022 | Radhakrishnan et al. | |
| 2023/0039182 A1* | 2/2023 | Cheng | G06N 3/098 |
| 2024/0256900 A1* | 8/2024 | Weng | G06N 3/098 |
| 2024/0362361 A1* | 10/2024 | Shao | G06F 21/6245 |
| 2025/0315732 A1* | 10/2025 | Ustyuzhanin | G06F 17/16 |

OTHER PUBLICATIONS

Orekondy et al., "Knockoff Nets: Stealing Functionality of Black-Box Models", Proceedings of the IEEE/CVF Conference on Computer Vision and Pattern Recognition (CVPR), Jun. 16-20, 2019, pp. 4954-4963.

Hitaj et al., "Deep Models Under the GAN: Information Leakage from Collaborative Deep Learning", Proceedings of the ACM SIGSAC Conference on Computer and Communications Security, Oct. 30-Nov. 3, 2017, pp. 603-618.

Mandal et al., "PrivFL: Practical Privacy-preserving Federated Regressions on High-dimensional Data over Mobile Networks", Proceedings of the ACM SIGSAC Conference on Cloud Computing Security Workshop, Nov. 11, 2019, pp. 57-68.

Phong et al., "Privacy-Preserving Deep Learning via Additively Homomorphic Encryption", IEEE Transactions on Information Forensics and Security, vol. 13, No. 05, May 2018, pp. 1333-1345.

Hsieh et al., "Gaia: Geo-Distributed Machine Learning Approaching LAN Speeds", Proceedings of the 14th USENIX Symposium on Networked Systems Design and Implementation (NSDI), Mar. 27-29, 2017, pp. 629-647.

Bagdasaryan et al., "Differential Privacy Has Disparate Impact on Model Accuracy", Proceedings of the 33rd Conference on Neural Information Processing Systems (NeurIPS), 2019, pp. 1-10.

Du et al., "Privacy-Preserving Multivariate Statistical Analysis: Linear Regression and Classification", Proceedings of the SIAM International Conference on Data Mining (SDM), 2004, pp. 222-233.

Bonawitz et al., "Practical Secure Aggregation for Privacy-Preserving Machine Learning", Proceedings of the ACM SIGSAC Conference on Computer and Communications Security, Oct. 30-Nov. 3, 2017, pp. 1175-1191.

Takabi et al., "Privacy Preserving Multi-party Machine Learning with Homomorphic Encryption", Proceedings of the 30th International Conference on Neural Information Processing Systems (NIPS), Dec. 5-10, 2016, pp. 1-5.

Gregor et al., "Trust Management as a Service: Enabling Trusted Execution in the Face of Byzantine Stakeholders", 50th Annual IEEE/IFIP International Conference on Dependable Systems and Networks (DSN), Jun. 29-Jul. 2, 2020, pp. 502-514.

Volos et al., "Graviton: Trusted Execution Environments on GPUs", 13th USENIX Symposium on Operating Systems Design and Implementation, Oct. 8-10, 2018, pp. 681-696.

Tramer et al., "Slalom: Fast, Verifiable and Private Execution of Neural Networks in Trusted Hardware", arxiv, Jun. 8, 2018, pp. 1-15.

Ohrimenko et al., "Oblivious Multi-Party Machine Learning on Trusted Processors", Proceedings of the 25th USENIX Security Symposium, Aug. 10-12, 2016, pp. 619-636.

Tianjian, "Federated Learning Inside: Introduction to Ant Financial's shared learning", Published in Federated Learning, Jul. 2, 2017, 8 pages.

Hunt et al., "Chiron: Privacy-preserving Machine Learning as a Service", arxiv, Mar. 15, 2018, pp. 1-15.

Arnautov et al., "SCONE: Secure Linux Containers with Intel SGX", Proceedings of the 12th USENIX Symposium on Operating Systems Design and Implementation, Nov. 2-4, 2016, pp. 689-703.

Bayerl et al., "Offline Model Guard: Secure and Private ML on Mobile Devices", Proceedings of the 23rd Conference on Design, Automation and Test in Europe, Mar. 2020, pp. 460-465.

"Ping An: Security Technology Reduces Data Silos", Intel, Retrieved on Feb. 26, 2024, Webpage available at : https://www.intel.com/content/www/us/en/customer-spotlight/stories/ping-an-sgx-customer-story.html.

Wu et al., "A Privacy Preserving ML System", Electronics Engineering & Computer Sciences, UC Berkeley, pp. 1-12.

Jia et al., "Preserving Model Privacy for Machine Learning in Distributed Systems", IEEE Transactions on Parallel and Distributed Systems, vol. 29, No. 8, Aug. 2018, pp. 1808-1822.

"Pysyft, Pytorch and Intel SGX: Secure Aggregation on Trusted Execution Environments", Openmined, Retrieved on Feb. 26, 2024, Webpage available at : https://blog.openmined.org/pysyft-pytorch-intel-sgx/.

Hynes et al., "Efficient Deep Learning on Multi-Source Private Data", arxiv, Jul. 17, 2018, 7 pages.

Samadi et al., "Paraprox: pattern-based approximation for data parallel applications", ACM SIGARCH Computer Architecture News, Mar. 1-5, 2014, pp. 35-50.

Lee et al., "On Model Parallelization and Scheduling Strategies for Distributed Machine Learning", Advances in Neural Information Processing Systems 27, Dec. 8-13, 2014, pp. 1-9.

Abadi et al., "Deep Learning with Differential Privacy", Proceedings of the ACM SIGSAC Conference on Computer and Communications Security, Oct. 24-28, 2016, pp. 308-318.

Li et al., "Federated Learning: Challenges, Methods, and Future Directions", IEEE Signal Processing Magazine, vol. 37, No. 03, May 2020, pp. 50-60.

Fereidooni et al., "SAFELearn: Secure Aggregation for private FEderated Learning", IEEE Security and Privacy Workshops (SPW), 2021, pp. 56-62.

Zhang et al., "Citadel: Protecting Data Privacy and Model Confidentiality for Collaborative Learning", Proceedings of the ACM Symposium on Cloud Computing, Nov. 1-4, 2021, pp. 546-561.

Mo et al., "SoK: Machine Learning with Confidential Computing", arxiv, Aug. 22, 2022, pp. 1-18.

Yu et al., "Differentially Private Model Publishing for Deep Learning", IEEE Symposium on Security and Privacy (SP), May 19-23, 2019, pp. 332-349.

Du et al., "Dynamic Differential-Privacy Preserving SGD", arXiv, Jan. 17, 2022, 16 pages.

Haruki et al., "Gradient Noise Convolution (GNC): Smoothing Loss Function for Distributed Large-Batch SGD", arXiv, Jun. 26, 2019, pp. 1-19.

Dupuy et al., "An Efficient DP-SGD Mechanism for Large Scale NLU Models", IEEE International Conference on Acoustics, Speech and Signal Processing (ICASSP), May 23-27, 2022, pp. 4118-4122.

Fu et al., "Adap DP-FL: Differentially Private Federated Learning with Adaptive Noises", IEEE International Conference on Trust, Security and Privacy in Computing and Communications (TrustCom), Dec. 9-11, 2022, pp. 656-663.

Wang et al., "DP-LSSGD: A Stochastic Optimization Method to Lift the Utility in Privacy-Preserving ERM", Proceedings of Machine Learning Research, vol. 107, Jul. 20-24, 2020, pp. 328-351.

Zhou et al., "Bypassing the Ambient Dimension: Private SGD with Gradient Subspace Identification", arXiv, Apr. 23, 2021, pp. 1-35.

Lin et al., "Understanding adaptive gradient clipping in DP-SGD, empirically", International Jounal of Intelligent Systems, vol. 37, No. 11, Aug. 25, 2022, pp. 9674-9700.

Li et al., "Differentially Private Federated Learning in Edge Networks: The Perspective of Noise Reductiony", IEEE Network, vol. 36, No. 05, Sep./Oct. 2022, pp. 167-172.

Guo et al., "Topology-Aware Differential Privacy for Decentralized Image Classification", IEEE Transactions on Circuits and Systems for Video Technology, vol. 32, No. 06, Jun. 2022, pp. 4016-4027.

Cyffers et al., "Privacy Amplification by Decentralization", Proceedings of The 25th International Conference on Artificial Intelligence and Statistics, vol. 151, Mar. 28-30, 2022, 20 pages.

(56)           References Cited

OTHER PUBLICATIONS

Jiang et al., "Dordis: Efficient Federated Learning with Dropout-Resilient Differential Privacy", arXiv, Nov. 10, 2023, 21 pages.

"DCsv3 and DCdsv3-series", Microsoft, Retrieved on Feb. 25, 2024, Webpage available at : https://learn.microsoft.com/en-us/azure/virtual-machines/dcv3-series.

De et al., "Unlocking High-Accuracy Diferentially Private Image Classifcation through Scale", arXiv, Jun. 16, 2022, pp. 1-34.

Koskela, "Analyze the correction formula tightly", Nokia Bell Labs, 2022, pp. 1-3.

"Gaussian Mechanism with Noise Correction", 2022, pp. 1-14.

Luo et al., "SVFL: Efficient Secure Aggregation and Verification for Cross-Silo Federated Learning", IEEE Transactions on Mobile Computing, vol. 23, No. 01, Jan. 2024, pp. 850-864.

Tenison et al., "Gradient-Masked Federated Optimization", ICLR, Workshop on Distributed and Private Machine Learning (DPML), 2021, pp. 1-7.

Office action received for corresponding Finnish Patent Application No. 20235286, dated Jul. 20, 2023, 11 pages.

Extended European Search Report received for corresponding European Patent Application No. 24157418.5, dated Jun. 24, 2024, 10 pages.

* cited by examiner

METHOD FOR COLLABORATIVE MACHINE LEARNING

TECHNICAL FIELD

The present invention relates to machine learning, and in particularly to a collaborative machine learning.

BACKGROUND

One area of Machine Learning (ML) is collaborative machine learning. Successfully enabling large scale Machine Learning requires a framework in which different entities collaborate to bring together large datasets, advanced expertise in model design and training, and large computing resources. Such a collaboration requires the different entities to have guarantees that their confidential information (both data and models) will not be publicly revealed. In other words, both data privacy, referring to keeping the records used as part of the training private, and model confidentiality, referring to keeping ML models confidential, are required to convince different entities to involve in such collaboration.

However, the existing solutions for collaborative machine learning focus on preserving the privacy of the data without protecting the model itself. As a result, they cannot preserve both data privacy and model confidentiality simultaneously in scenarios where multiple entities might be colluding or attempting to leverage inference attacks against the model.

SUMMARY

Now, improved methods and technical equipment implementing the methods have been invented, by which the above problems are alleviated. Various aspects include a system, multiple apparatus and non-transitory computer readable media comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided a system comprising at least one training unit for one or more data owners collaborating to the system for storing private data and at least one encrypted model, said training unit being implemented as a trusted execution environment; at least one aggregator unit for each model owner collaborating to the system for storing and executing code of a training algorithm, said aggregator unit being implemented as a trusted execution environment; at least one administration unit for controlling communication and synchronization between the at least one training unit and the at least one aggregator unit, said administration unit being implemented as a trusted execution environment; wherein the communication between the at least one training unit and the at least one aggregator unit is encrypted.

An apparatus according to a second aspect comprises at least one training unit for one or more data owners collaborating to a system for storing private data and at least one encrypted model, said training unit being implemented as a trusted execution environment; said training unit being configured to communicate with at least one aggregator unit of the system; wherein the communication between the at least one training unit and the at least one aggregator unit is encrypted.

According to an embodiment, the at least one training unit is configured to compute model gradients based on the private data of one or more respective data owners using said at least one encrypted model.

According to an embodiment, the at least one training unit is configured to send the gradients to at least one administration unit and receive a mask for the gradients from the at least one administration unit.

According to an embodiment, the at least one training unit is configured to apply its corresponding mask received from the administration unit to the model gradient and transmit a masked model gradient to the at least one aggregator unit.

According to an embodiment, the at least one training unit is configured to receive information indicating a subset of gradients to use from the administration unit.

According to an embodiment, the at least one training unit is configured to randomly select a subset of gradients to use.

According to an embodiment, the at least one training unit is prevented from interacting with any data unit outside the training unit, except via one or more predetermined interfaces of the system.

An apparatus according to a third aspect comprises at least one aggregator unit for each model owner collaborating to a system for storing and executing code of a training algorithm, said aggregator unit being implemented as a trusted execution environment; said aggregator unit being configured to communicate with at least one training unit of the system; wherein the communication between the at least one training unit and the at least one aggregator unit is encrypted.

According to an embodiment, the at least one aggregator unit is configured to receive a masked model gradient from the at least one training unit and update the model based on the masked model gradients.

According to an embodiment, the at least one aggregator unit is prevented from interacting with any data unit outside the aggregator unit, except via one or more predetermined interfaces of the system.

An apparatus according to a fourth aspect comprises at least one administration unit for controlling communication and synchronization between at least one training unit and at least one aggregator unit, said administration unit being implemented as a trusted execution environment.

According to an embodiment, the at least one administration unit is configured to receive the gradients from the training units, generate masks for the gradients of each of the training units such that the sum of the masks equals to a predefined noise level, and transmit the masks to corresponding training units.

According to an embodiment, the masks are computed as $$\sum_{i=0}^{n} m_i \sim N(0, \sigma^2 C^2 I) \sim \xi$$

where $m_i$ is the mask sent to the i-th training enclave, $\sigma$ is the privacy parameter, and C is the gradient clipping bound.

According to an embodiment, administration unit is configured to receive a sample of norms of respective gradients from one or more training units; create an approximation of the distribution of gradient norms across all the gradients;

select a threshold value for a clipping bound based on a predefined distribution-dependent target value; and send said threshold value to said one or more training units.

According to an embodiment, the administration unit is configured to compute a noise value at a present time instance, wherein a weighted noise value of a previous time instance is subtracted from a new noise value introduced at the present time instance.

According to an embodiment, the administration unit is configured to provide one or more training units with information indicating a subset of gradients to use.

Computer readable storage media according to further aspects comprise code for use by an apparatus, which when executed by a processor, causes the apparatus to perform the above functions.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

Figure 1:
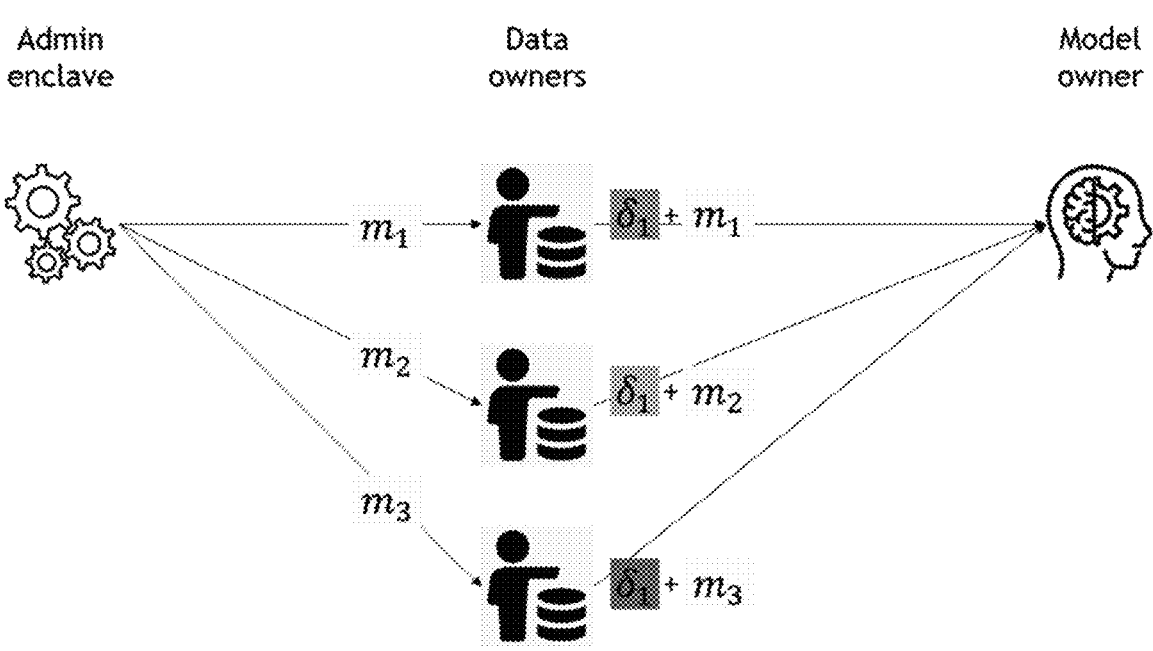
FIG. 1 illustrates the principle of utilising differential privacy (DP) in various embodiments.

The following describes in further detail suitable apparatus and possible mechanisms for collaborative machine learning. Before discussing the present embodiments in more detailed manner, a short reference to related technology is given.

Machine learning refers to algorithms (i.e., models) that are able to learn through experience and improve their performance based on learning. One of the areas of machine learning is collaborative machine learning. The collaborative machine learning can include several areas, for example, 1) collaborative learning; and 2) collaborative inference. In collaborative learning, a model is learned collaboratively as in federated learning, where the learned models on local data are exchanged between devices (or institutes) until a global model is obtained. In collaborative inference, a problem is collaboratively solved, where features extracted on one device (or an institute) can become available to another device (or another institute) who uses those features for solving a problem. It is to be noticed that in this disclosure term "device" will be used to refer to a physical device or to an institute. An institute as such is an entity, e.g., a hospital, a school, a factory, an office building. However, for simplicity, term "device" in this disclosure should be interpreted to cover both the physical device and the institute.

A neural network (NN) is a computation graph consisting of several layers of computation. Each layer consists of one or more units, where each unit performs an elementary computation. A unit is connected to one or more other units, and the connection may have associated with a weight. The weight may be used for scaling the signal passing through the associated connection. Weights are learnable parameters, i.e., values which can be learned from training data. There may be other learnable parameters, such as those of batch-normalization layers.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more of preceding layers and provide output to one or more of following layers.

Initial layers (those close to the input data) extract semantically low-level features, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

One of the important properties of neural networks (and other machine learning tools) is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, i.e., to gradually decrease the loss.

Herein, term "model" may refer to "neural network", and the weights of neural networks are sometimes referred to as learnable parameters or simply as parameters.

Training a neural network is an optimization process. The goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data may be split into at least two sets, the training set and the validation set. The training set is used for training the network, i.e., to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following things:

If the network is learning at all—in this case, the training set error should decrease, otherwise the model is in the regime of underfitting.

If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set but performs poorly on a set not used for tuning its parameters.

Before discussing the embodiments in more detailed manner, a few terms are defined.

Data privacy refers to keeping the records used as part of the training private. Private data may include, but is no limited to, medical records, credit card information, or personal emails and addresses. Those records may have to be kept private for multiple reasons:

Regulatory requirements: Legislations like GDPR and CCPA require that the privacy of consumer data be protected.

Contractual requirements: A company handling the data of a client company or a private customer may have to fulfil contractual obligations to keep said data private.

Economic interests: The process of data collection and curation might be expensive and represent a costly investment, and leaking said information might represent a financial loss as well as reputational harm leading to the same.

Model confidentiality refers to keeping ML models confidential. This process is necessary because the design and training of the model itself may represent valuable information, which may be seen as intellectual property that needs to be kept confidential. Furthermore, the task being completed may be sensitive (e.g., a specific way of handling data in line with the model owner's business interests). Model confidentiality refers to all aspects of the model, including the model structure, the training hyper-parameters, and the trained model weights, as well as the way how one can train the model. Model confidentiality may also include the pre-processing and preparation of the data that is to be used in the training.

Federated Learning (FL) is an ML technique for training a model collaboratively between multiple entities, whereby these entities (e.g. devices or servers) each hold a part of the training data but do not exchange said data. FL has been used both to avoid expensive data transfers between edge devices and the cloud, as well as to protect the privacy of the training data.

Trusted Execution Environment (TEE) is a secure area of a processor. It guarantees application code and data loaded inside to be protected with respect to confidentiality and integrity using specialized hardware. In general terms, the TEE offers an execution space that provides a higher level of security for applications than a rich operating system and more functionality than a 'secure element' (SE); thus, increasing the trust of the user in the executing application. One of the most popular commercially available TEE solutions is Intel Secure Guard Extensions (SGX). There are also TEE solutions from other vendors, such as Arm TrustZone.

Differential Privacy (DP) is a technique for publicly sharing information about a dataset while withholding information about individuals in the dataset. The shared information represents the general patterns of the dataset, but not about individual points. In the context of ML, DP exposes (either during training or through the final model) general trends about the training data without revealing if any specific data point was used for training the model.

Successfully enabling large scale Machine Learning (ML) requires a framework in which different entities collaborate to bring together large datasets, advanced expertise in model design and training, and large computing resources. Such a collaboration requires the different entities to have guarantees that their confidential information (both data and models) will not be publicly revealed.

Accordingly, there is a need for a method and related apparatus for collaboratively training an ML model while keeping the training data private, as well as the training methodology and the ML model itself confidential.

In the following, an enhanced system for collaboratively training an ML model will be described in more detail, in accordance with various embodiments. It is noted that the system and the features and units belonging thereto may be implemented in one apparatus or as shared among two or more apparatus.

The system comprises at least one training unit for one or more data owners collaborating to the system for storing private data and at least one encrypted model, said training unit being implemented as a trusted execution environment; at least one aggregator unit for each model owner collaborating to the system for storing and executing code of a training algorithm, said aggregator unit being implemented as a trusted execution environment; at least one administration unit for controlling communication and synchronization between the at least one training unit and the at least one aggregator unit, said administration unit being implemented as a trusted execution environment; wherein the communication between the at least one training unit and the at least one aggregator unit is encrypted.

Thus, the system enables federated learning (FL) on untrusted cloud infrastructure while protecting both the data and the models under conditions where participants might be colluding or trying to attack the model. It guarantees that none of the data owners, model owner and cloud provider can read the intermediate computation results, or the private data and models, that it is not authorized to access. This is achieved by establishing multiple mutually trusted execution environments (TEEs) on behalf of both the data owners and the model owner and carrying out the communication between TEEs as encrypted.

The training unit may be referred to herein also as a training enclave. The aggregator unit may be referred to herein also as an aggregator enclave. The administration unit may be referred to herein also as an administration enclave.

According to an embodiment, the at least one training unit is configured to compute model gradients based on the private data of one or more respective data owners using said at least one encrypted model.

Thus, the training enclave implemented as a TEE may comprise computer code, which when executed by at least one processor, causes the training enclave, for example, to download the private data of the owner, receive the encrypted model, and the compute the model gradients based on the private data of each respective data owner using said at least one encrypted model. It is noted that there may be multiple training units collaboratively storing data for one data owner, or there may be one training unit storing data for multiple data owners. Thus, the association between training units and data owners does not necessarily have to be one-to-one.

According to an embodiment, the at least one administration unit is configured to receive the gradients from the training units, transmitted as encrypted, generate masks for the gradients of each of the training units such that the sum of the masks equals to a predefined noise level, and transmit the masks to corresponding training units.

Herein, the administration enclave running inside a TEE generates a plurality of masks such that the sum of the masks is equal to the noise to be implemented as differential privacy (DP). The aggregate noise level may be a predefined value, e.g. its amplitude may be decided based on the available privacy budget.

According to an embodiment, the at least one training unit is configured to apply its corresponding mask received from the administration unit to the model gradient and transmit a masked model gradient to the at least one aggregator unit.

Hence, the application of the masks generated by the administration enclave enables the utilisation of differential privacy (DP) to further enhance the privacy of the involved data and models. The aggregator enclave receives only masked gradients from the training enclaves, thereby hiding the actual gradients of the training enclaves.

Herein, there are at least two options for accumulating the encrypted masked gradients to the aggregator enclave:

1) the training enclaves send them directly to the aggregator enclave, which then adds them up, as described above;

2) the training enclaves form a tree (e.g., binary tree), whose root is the aggregator enclave, and the training enclaves form the leaves. Starting from the leaves, a training enclave sends its masked encrypted gradients to another leaf at the same level, which aggregates the received encrypted masked gradients and send it up one level in the tree until the masked gradients of all involved training enclaves have been accumulated and sent to the aggregator enclave.

According to an embodiment, the at least one aggregator unit is configured to receive the masked model gradients from the at least one training unit and apply the model gradients for updating the model.

Thus, the aggregator enclave implemented as a TEE may comprise computer code, which when executed by at least one processor, causes the aggregator enclave, for example, use a training algorithm and hyperparameters obtained from the model owner to apply the model gradients to update the model.

FIG. 1 illustrates the principle of utilising differential privacy (DP) in various embodiments. The administration enclave implemented as a TEE may comprise computer code, which when executed by at least one processor, causes the administration enclave to generate masks $m_i$ such that the sum of the masks is equal to the DP noise $\xi$, whose amplitude is decided based on the privacy budget. Each training enclave implemented as a TEE running on behalf of each data owner computes the model update (i.e., gradients) $\delta_i$ based on the private data of each respective data owner and adds the mask obtained from the administration enclave to the gradient. Each training enclave then sends the masked gradient $\delta_i + m_i$ to the aggregator enclave implemented as a TEE running on behalf of the model owner. When summing these masked gradients, the model updating logic from the model owner running in the aggregator enclave then only recovers the model update with added DP noise. As a result, the next iteration of the training continues with an updated model that contains DP noise.

Figure 2:
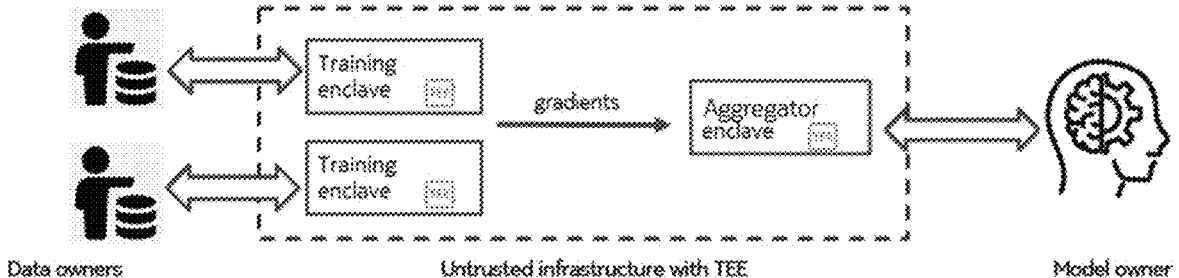
FIG. 2 illustrates the system architecture between an aggregator enclave representing the model owner and a plurality of training enclaves according to an example embodiment.

FIG. 2 illustrates the system architecture between an aggregator enclave representing the model owner and a plurality of training enclaves, each or a plurality of them representing one or more data owners. It is noted that the system architecture as described above enables to protect both the data and the models, even if implemented in untrusted cloud infrastructure.

Figure 3:
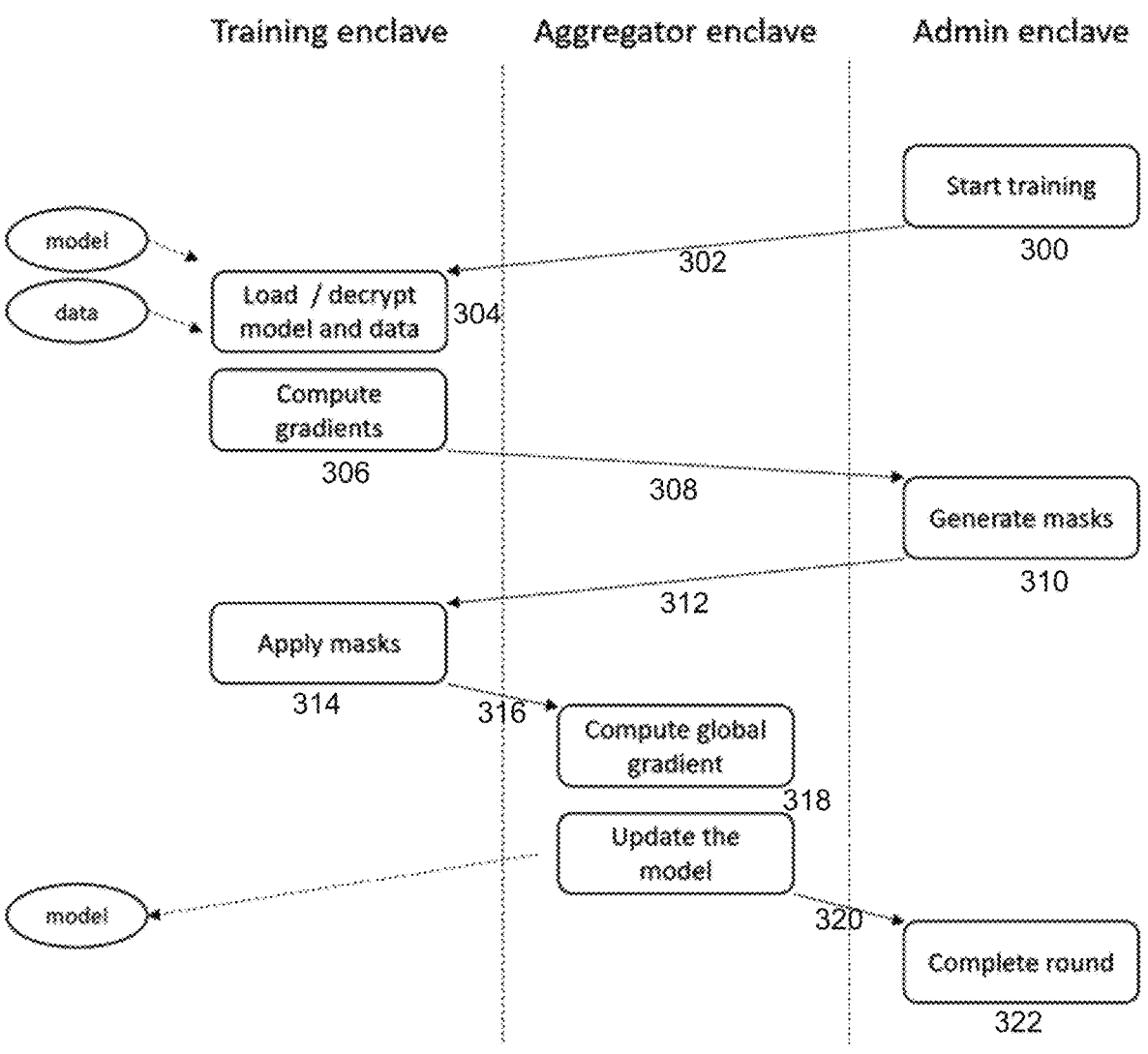
FIG. 3 shows a workflow for a typical round of training according to some embodiments.

The signaling chart of FIG. 3 illustrates a workflow for a typical round of training. The administration enclave triggers (300) the start of the next round of training, and signals (302) a related indication to each involved training enclave. Each training enclave downloads the private data of the owner and the encrypted model, if not previously carried out, and decrypts the data and the model (304). Each training enclave computes (306) its local updates (i.e., gradients) and signals (308) the gradients to the administration enclave. The administration enclave generates (310) the DP-noisy masks and delivers (312) a corresponding mask to each involved training enclave.

The training enclaves apply (314) their corresponding masks to their gradients to hide the actual gradients. The training enclaves transmit (316) the masked model gradients to the aggregator enclave, which aggregates (i.e., sums) all masked model gradients and applies a global gradient (318) to update the model. This is indicated (320) the administration enclave to conclude that this training round is completed (322).

Thus, the Differential Privacy is implemented herein by adding noise to the mask generation. In the training round shown in FIG. 3, this is carried out by the administration enclave, which generates (310) the DP-noisy masks.

According to an embodiment, the masks are computed such that $$\sum_{i=0}^{n} m_i \sim N(0, \sigma^2 C^2 I) \sim \xi$$

where $m_i$ is the mask sent to the i-th training enclave, $\sigma$ is the privacy parameter, and C is the gradient clipping bound. The term $N(0, \sigma^2 C^2 I)$ may be referred to herein as the noise parameter that adds DP to the model.

In step 318 of FIG. 3, the aggregator enclave receives the masked gradients $\delta_i + m_i$ and sums them, recovering the value $$\sum_{i=0}^{n} (\delta_i + m_i) = \sum_{i=0}^{n} \delta_i + \xi$$

Because the masks are generated inside the administration enclave and the administration enclave sends a separate mask to each training enclave, the following properties can be observed:

In the absence of collusion, the model owner only sees, for each masked gradient received, the value $\delta_i + m_i$, which does not reveal anything about the private value $\delta_i$ because of the mask.

In case of collusion between the model owner and n−1 data owners, the attackers can choose to reveal their own mask. In this case, the information recovered about the victim is $\delta_i + \xi$. Because all the DP noise that was added is concentrated on this single value, the value $\delta_i$ is guaranteed to have DP.

The computed model update, $$\sum_{i=0}^{n} \delta_i + \xi,$$

is equal to the non-private model update plus the DP noise, providing the same model utility as Stochastic gradient descent with Differential Privacy (DP-SGD), which is a technique for centralized learning in which random noise is added to model updates. DP-SGD gives strong guarantees of privacy for individual dataset items used in the trained model but does not protect the data privacy and the model confidentiality during training.

Accordingly, in this approach only the noise value $\xi$ is required to protect the data of a single data owner in each update, but it nevertheless provides DP guarantees to all data owners in the process, without any assumption about which one is being colluded against.

Adding noise to the model update is likely to degrade the model utility (i.e., accuracy). For example, in some DP-SGD approaches this has been addressed by requiring gradients with a bounded norm, which is enforced by clipping the gradients that are above the threshold C. However, selecting C can be difficult: a too large value of C will require a large amount of noise, while a too small value of C will lead to the clipping of unnecessarily large number of gradients. Both cases would degrade the model utility.

According to an embodiment, the administration unit is configured to receive a sample of norms of respective gradients from one or more training units; create an approximation of the distribution of gradient norms across all the gradients; select a threshold value for a clipping bound based on a predefined distribution-dependent target value; and send said threshold value to said one or more training units.

Thus, the value of the clipping bound is computed such that it will always clip at most r of the gradients (r is a parameter of the system, e.g. 10%). Accordingly, after computing the gradients in step 306 of FIG. 3, each training enclave sends a sample of the norms of its respective gradients to the administration enclave.

To select the dynamic gradient clipping, for example the following algorithm may be used:

Given a set of percentiles $p_1, p_2, \ldots, p_m$ and a target r:

Step 1: Each training enclave computes the norm of its gradients and orders them by magnitude and sends the norms matching $p_1, p_2, \ldots, p_m$ as well as the number of gradients to the administration enclave.

Step 2: The administration enclave receives the percentiles from all the training enclaves and builds an approximation of the distribution of gradient norms across all the gradients.

Step 3: The administration enclave selects the value C* matching the $r^{th}$ percentile from this distribution as a clipping bound and sends it back to the training enclaves.

Step 4: Each training enclave clips the gradients to have a norm of at most C*.

It is noted that in Step 3, a small amount of noise may be added to hide the exact value of the $r^{th}$ percentile of gradient norms and to preserve DP properties.

According to an embodiment, the administration unit is configured to compute a noise value at a present time instance, wherein a weighted noise value of a previous time instance is subtracted from a new noise value introduced at the present time instance.

By reducing some of the noise over future epochs, the model updates can be made more private while maintaining the privacy and accuracy of the final model.

Assuming that the administration enclave used noise $\xi_t$ during the training round t, the noise used at time t+1 can be computed as $$\xi_{t+1} = X_{t+1} - \lambda \xi_t$$

where $\lambda \in [0,1]$ and each element of the vector $X_{t+1}$ is normally distributed with zero mean and variance $\bar{\sigma}^2 C^2$, where $$\bar{\sigma} = \frac{\sigma}{1-\lambda},$$

where $\sigma$ is a free noise scaling parameter. The elements of the noise vector $X_t$ are mutually independent between every dimension and between all t. With the above noise scaling $\sigma$, the total amount of noise injected during the training is approximately independent of $\lambda$ and only determined by $\sigma$. With the above noise scaling, the privacy protection is only determined by $\sigma$.

The noise correction mentioned above improves the privacy protection of individual updates and of short sequences of updates as follows. If the adversary observes only a single update, the total noise variance is bigger than the noise variance of $N(0, \bar{\sigma}^2 C^2 I)$. For example, if $\lambda = \frac{1}{2}$, and adversary observes only the second update, the total noise is distributed as $$N\left(0, \sigma^2 (2C)^2 \left(1 + \left(\frac{1}{2}\right)^2\right)\right) = N(0, 5\sigma^2 C^2 I).$$

Thus, compared to plain DP-SGD without the 'correction', there is five times more noise variance protecting the second update in case the adversary observes only that. The protection of all individual updates can be analyzed, and they are similarly stronger than the individual updates of DP-SGD.

This reduces the noise added at time t by subtracting it at time t+1. Because this value is computed inside the administration enclave, an attacker cannot know which part of $\xi_{t+1}$ is from the previous noise, and which part was added at this step. Consequently, this technique does not leak the value $\lambda \xi_t$.

It is also possible to reduce the noise required to ensure privacy by using a random sample of the gradients instead of all gradients (i.e., by randomly choosing to include or not to include a gradient at some iteration). By giving each gradient a probability p of being included in the current update, the noise can be scaled down by the same factor to be added in this update.

According to an embodiment, the administration unit is configured to provide one or more training units with information indicating a subset of gradients to use.

Thus, as a first implementation option of this technique, the administration enclave decides which gradients are included. In addition to generating masks, the administration enclave may, for example, generate a bitmap in which each bit indicates whether a particular gradient should be included in the update or not. This implementation guarantees that exactly $p \cdot N$ gradients (given N is the total number of gradients coming from N data owners) are used, but imposes a minor additional burden on the administration enclave.

According to an embodiment, the at least one training unit is configured to randomly select a subset of gradients to use.

As a second implementation option of this technique, each training enclave will randomly select its gradients with probability p. This approach does not require a decision from the administration enclave, but the number of gradients included will not be exactly p·N.

In the workflow, such as the workflow described in FIG. 3, it is assumed that computing the gradients by the training enclaves in step 306 and updating the model by the aggregator enclave in step 318 use code provided by the model owner. Because said code is running inside the enclave, it has access to the decrypted confidential model as well as decrypted private data, in order to compute gradients in the training enclave and (DP-noised) masked gradients for updating the model in the aggregator enclave. However, because this code may contain confidential information about the model, it cannot be analyzed, investigated and/or verified by the other parties (i.e., data owners).

To guarantee that privacy is preserved, it is ensured that the code running in the training enclaves and the code running in the aggregator enclave do not leak information. This is achieved by sandboxing the training enclaves and the aggregator enclave so that they are prevented from interacting with storage outside of the enclave or with the network, except for the system's well-defined APIs to retrieve the encrypted data and the model as well as the communication among the enclaves. As such, the system enforces the following constraints:

Data owners must upload their data to the encrypted storage before the beginning of the training. After the training starts, the code running inside the training enclave is not allowed any interaction with insecure storage or the network. This is because the code for gradient computation must not persist any change, except for the gradients themselves.

The code running in the aggregator enclave must only see the masked and DP-noisy gradients, not individual raw gradients. This is because the model owner might store any intermediate updates as a fake "model update" to leak information about the gradients. Furthermore, the model owner only gets access to the final model after the training is complete.

As mentioned above, the system and the units and functionalities belonging thereto may be implemented in one or more apparatus. Considering an apparatus according to an aspect acting on behalf of at least one data owner comprises at least one training unit for one or more data owners collaborating to the system for storing private data and at least one encrypted model, said training unit being implemented as a trusted execution environment; said training unit being configured to communicate with at least one aggregator unit; wherein the communication between the at least one training unit and the at least one aggregator unit is encrypted.

According to an embodiment, the at least one training unit is configured to compute model gradients based on the private data of one or more respective data owners using said at least one encrypted model.

According to an embodiment, the at least one training unit is configured to send the gradients to at least one administration unit and receive a mask for the gradients from the at least one administration unit.

According to an embodiment, the at least one training unit is configured to apply its corresponding mask received from the administration unit to the model gradient and transmit a masked model gradient to the at least one aggregator unit.

According to an embodiment, the at least one training unit is configured to receive information indicating a subset of gradients to use from the administration unit.

According to an embodiment, the at least one training unit is configured to randomly select a subset of gradients to use.

Considering an apparatus according to an aspect acting on behalf of at least one model owner comprises at least one aggregator unit for each model owner collaborating to a system for storing and executing code of a training algorithm, said aggregator unit being implemented as a trusted execution environment; said aggregator unit being configured to communicate with at least one training unit; wherein the communication between the at least one training unit and the at least one aggregator unit is encrypted.

According to an embodiment, the at least one aggregator unit is configured to receive a masked model gradient from the at least one training unit and apply a sum of the model gradients for updating the model.

Considering an apparatus according to an aspect acting as administration enclave comprises at least one administration unit for controlling communication and synchronization between at least one training unit and at least one aggregator unit, said administration unit being implemented as a trusted execution environment.

According to an embodiment, the at least one administration unit is configured to receive gradients from the training units, transmitted as encrypted, generate masks for the gradients of each of the training units such that the sum of the masks equals to a predefined noise level, and transmit the masks to corresponding training units.

According to an embodiment, the masks are computed as $$\sum_{i=0}^{n} m_i \sim N(0, \sigma^2 C^2 I) \sim \xi$$

where $m_i$ is the mask sent to the i-th training enclave, $\sigma$ is the privacy parameter, and C is the gradient clipping bound.

According to an embodiment, the administration unit is configured to receive a sample of norms of respective gradients from one or more training units; create an approximation of the distribution of gradient norms across all the gradients; select a threshold value for a clipping bound based on a predefined distribution-dependent target value; and send said threshold value to said one or more training units.

According to an embodiment, the administration unit is configured to compute a noise value at a present time instance, wherein a weighted noise value of a previous time instance is subtracted from a new noise value introduced at the present time instance.

According to an embodiment, the administration unit is configured to provide one or more training units with information indicating a subset of gradients to use.

An apparatus according to an aspect comprises means for storing private data and at least one encrypted model for one or more data owners collaborating to a system, said means being implemented within a trusted execution environment; and means for communicating with at least means for storing and executing code of a training algorithm of the system as encrypted.

According to an embodiment, the apparatus comprises means for computing model gradients based on the private data of one or more respective data owners using said at least one encrypted model.

According to an embodiment, the apparatus comprises means for sending the gradients to means for controlling communication and synchronization in the system and receiving a mask for the gradients from the means for controlling communication and synchronization.

According to an embodiment, the apparatus comprises means for applying its corresponding mask received from the means for controlling communication and synchronization to the model gradient and means for transmitting a masked model gradient to the means for storing and executing code of a training algorithm.

According to an embodiment, the apparatus comprises means for receiving information indicating a subset of gradients to use from the means for controlling communication and synchronization.

According to an embodiment, the apparatus comprises means for randomly selecting a subset of gradients to use.

According to an embodiment, the apparatus comprises means for preventing interaction with any data unit outside the training unit, except via one or more predetermined interfaces of the system.

An apparatus according to another aspect comprises means for storing and executing code of a training algorithm for at least one model owner collaborating to a system, said means being implemented within a trusted execution environment; and means for communicating with means for storing private data and at least one encrypted model of the system as encrypted.

According to an embodiment, the apparatus comprises means for receiving a masked model gradient from the means for storing private data and at least one encrypted model and means for updating the model based on the masked model gradients.

According to an embodiment, the apparatus comprises means for preventing interaction with any data unit outside the aggregator unit, except via one or more predetermined interfaces of the system.

An apparatus according to yet another aspect comprises means for controlling communication and synchronization between means for storing private data and at least one encrypted model for one or more data owners collaborating to a system and means for storing and executing code of a training algorithm of the system, said means for controlling communication and synchronization being implemented within a trusted execution environment.

According to an embodiment, the apparatus comprises means for receiving gradients from the means for storing private data and at least one encrypted model, means for generating masks for the gradients of each of the means for storing private data and at least one encrypted model such that the sum of the masks equals to a predefined noise level, and means for transmitting the masks to corresponding means for storing private data and at least one encrypted model.

According to an embodiment, the masks are computed as $$\sum_{i=0}^{n} m_i \sim N\left(0, \sigma^2 C^2 I\right) \sim \xi$$

where $m_i$ is the mask sent to the i-th training enclave, $\sigma$ is the privacy parameter, and C is the gradient clipping bound.

According to an embodiment, the apparatus comprises means for receiving a sample of norms of respective gradients from one or more means for storing private data and at least one encrypted model; means for creating an approximation of the distribution of gradient norms across all the gradients; means for selecting a threshold value for a clipping bound based on a predefined distribution-dependent target value; and means for sending said threshold value to said one or more means for storing private data and at least one encrypted model.

According to an embodiment, the apparatus comprises means for computing a noise value at a present time instance, wherein a weighted noise value of a previous time instance is subtracted from a new noise value introduced at the present time instance.

According to an embodiment, the apparatus comprises means for providing one or more means for storing private data and at least one encrypted model with information indicating a subset of gradients to use.

According to an embodiment, said means in any of the above apparatus comprises at least one processor and at least one memory, said at least one memory stored with computer program code thereon, the at least one memory and the computer program code configured to, with the at least one processor, cause the apparatus at least to perform said steps.

Further aspects relate to computer program products, stored on a non-transitory memory medium, comprising computer program code, which when executed by at least one processor, causes an apparatus at least to perform at least to perform said steps.

Figure 4:
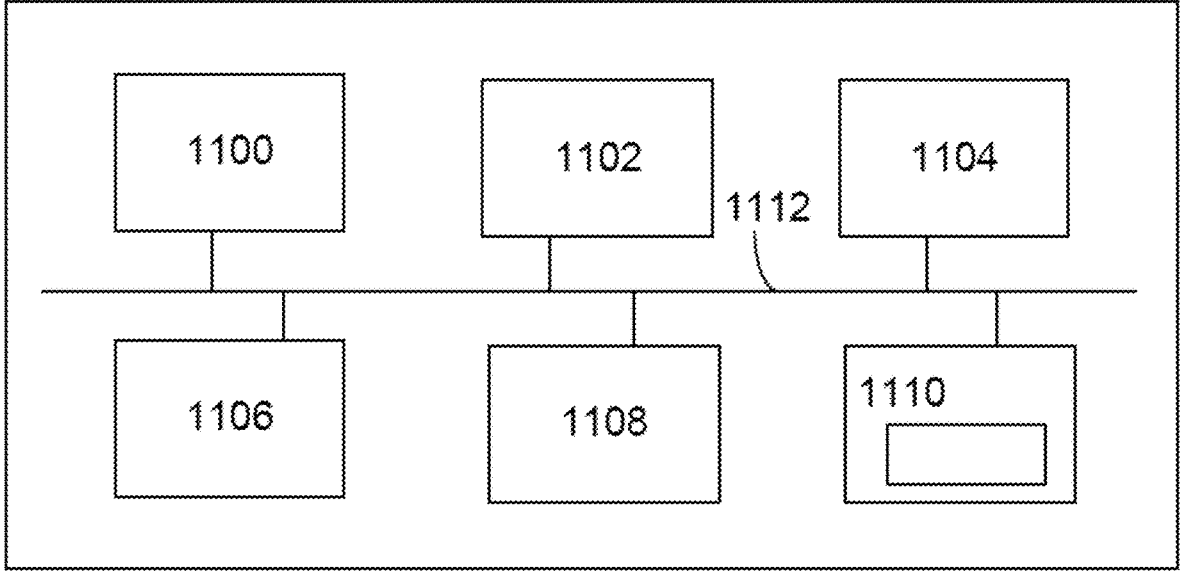
FIG. 4 shows a block chart of an apparatus according to an embodiment.

Such apparatuses may comprise e.g. apparatuses and/or the functional units disclosed in Figures for implementing the embodiments. FIG. 4 illustrates an apparatus according to an embodiment. The generalized structure of the apparatus will be explained in accordance with the functional blocks of the system. Several functionalities can be carried out with a single physical device, e.g. all calculation procedures can be performed in a single processor, if desired. A data processing system of an apparatus according to an example of FIG. 10 comprises a main processing unit 1100, a memory 1102, a storage device 1104, an input device 1106, an output device 1108, and a graphics subsystem 1110, which are all connected to each other via a data bus 1112. A client may be understood as a client device or a software client running on an apparatus.

The main processing unit 1100 is a processing unit arranged to process data within the data processing system. The main processing unit 1100 may comprise or be implemented as one or more processors or processor circuitry. The memory 1102, the storage device 1104, the input device 1106, and the output device 1108 may include other components as recognized by those skilled in the art. The memory 1102 and storage device 1104 store data in the data processing system 1100. Computer program code resides in the memory 1102 for implementing, for example, machine learning process. The input device 1106 inputs data into the system while the output device 1108 receives data from the data processing system and forwards the data, for example to a display. While data bus 1112 is shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising at least one training unit for one or more data owners collaborating to a system for storing private data and at least one encrypted model, said training unit being implemented as a trusted execution environment; said training unit being configured to communicate with at least one aggregator unit of the system; wherein the communication between the at least one training unit and the at least one aggregator unit is encrypted; and wherein at least one administration unit is configured to receive model gradients from the at least one training unit, generate masks for the gradients of each of the at least one training unit such that the sum of the masks equals to a predefined noise level, and transmit the masks to at least one corresponding unit of the at least one training unit; said at least one administration unit being configured for controlling communication and synchronization between the at least one training unit and the at least one aggregator, and said at least one administration unit being implemented in the trusted executed environment.

2. The apparatus according to claim 1, wherein the at least one training unit is configured to compute the gradients based on the private data of one or more respective data owners using said at least one encrypted model.

3. The apparatus according to claim 2, wherein the at least one training unit is configured to send the gradients to the at least one administration unit and receive its corresponding mask for the gradients from the at least one administration unit.

4. The apparatus according to claim 3, wherein the at least one training unit is configured to apply said corresponding mask received from the administration unit to the model gradient and transmit a masked model gradient to the at least one aggregator unit.

5. The apparatus according to claim 1, wherein the at least one training unit is configured to receive information indicating a subset of gradients to use from the administration unit.

6. The apparatus according to claim 1, wherein the at least one training unit is configured to randomly select a subset of gradients to use.

7. The apparatus according to claim 1, wherein the at least one training unit is prevented from interacting with any data unit outside the training unit, except via one or more predetermined interfaces of the system.

8. An apparatus comprising at least one aggregator unit for each model owner collaborating to a system for storing and executing code of a training algorithm, said aggregator unit being implemented as a trusted execution environment; said aggregator unit being configured to communicate with at least one training unit of the system; wherein the communication between the at least one training unit and the at least one aggregator unit is encrypted; and wherein at least one administration unit is configured to receive model gradients from the at least one training unit, generate masks for the gradients of each of the at least one training unit such that the sum of the masks equals to a predefined noise level, and transmit the masks to at least one corresponding unit of the at least one training unit; said at least one administration unit being configured for controlling communication and synchronization between the at least one training unit and the at least one aggregator, and said at least one administration unit being implemented in the trusted executed environment.

9. The apparatus according to claim 8, where the at least one aggregator unit is configured to receive a masked model gradient from the at least one training unit and update the model based on the masked model gradients.

10. The apparatus according to claim 8, wherein the at least one aggregator unit is prevented from interacting with any data unit outside the aggregator unit, except via one or more predetermined interfaces of the system.

11. An apparatus comprising at least one administration unit for controlling communication and synchronization between at least one training unit and at least one aggregator unit, said administration unit being implemented as a trusted execution environment; wherein the at least one administration unit is configured to receive gradients from the at least one training unit, generate masks for the gradients of each of the at least one training unit such that the sum of the masks equals to a predefined noise level, and transmit the masks to at least one corresponding unit of the at least one training unit.

12. The apparatus according to claim 11, wherein the masks are computed as $$\sum_{i=0}^{n} m_i \sim N(0, \sigma^2 C^2 I) \sim \xi$$

where $m_i$ is the mask sent to the i-th training enclave, $\sigma$ is the privacy parameter, and C is the gradient clipping bound.

13. The apparatus according to claim 11, the administration unit is configured to receive a sample of norms of respective gradients from one or more training units; create an approximation of the distribution of gradient norms across all the gradients; select a threshold value for a clipping bound based on a predefined distribution-dependent target value; and send said threshold value to said one or more training units.

14. The apparatus according to claim 11, wherein the administration unit is configured to compute a noise value at a present time instance, wherein a weighted noise value of a previous time instance is subtracted from a new noise value introduced at the present time instance.

15. The apparatus according to claim 11, wherein the administration unit is configured to provide one or more training units with information indicating a subset of gradients to use.

\* \* \* \* \*